Patented Dec. 15, 1953

2,662,849

UNITED STATES PATENT OFFICE 2,662,849

PROCESS FOR TREATING TALL OIL

Emmett P. Glynn, Chicago, Ill., and Burt F. Hofferth, Ames, Iowa, assignors to Armour and Company, Chicago, Ill., a corporation of Illinois No Drawing. Application June 7, 1946, Serial No. 675,303

4 Claims. (Cl. 202—71)

This invention relates to a process for treating tall oil to prepare valuable products therefrom. The invention is particularly useful in separating the acid constituents of the tall oil.

Tall oil is a dark colored liquid by-product of the paper industry. It is obtained from the "black liquor" residue of pulp wood in the manufacture of paper. While available commercially in enormous quantities, its use in industry has been limited because of its generally objectional character and the difficulty of treatment; even when the prepared tall oil has been used, it has often been quite unsatisfactory.

Crude tall oil contains complex resin acids, many of which have not been specifically identified, fatty acids including principally oleic, linoleic and linolenic acids, other volatile constituents including unsaponifiable materials, and non-volatile matter of a pitchy character.

The problem of separation of the acid constituents of tall oil is complicated by the contaminating effect of the resinous materials on the fatty acids and also by the tendency of certain constituents, when subjected to heat, to break down forming further color or odor bodies to the detriment of the product.

Attempts heretofore to produce separation of the resin acids and fatty acids through the use of solvents have been ineffective in producing a sufficiently sharp separation of fatty acids and resin acids while at the same time freeing these acids from other substances in tall oil which act as contaminants.

We have attempted to bring about separation of desired constituents of tall oil through the use of fractional crystallization while preferably employing solvents such as acetone, etc. The results have not been satisfactory and we have discovered that such results are due to the presence of at least a part of a saturated fatty acid of shorter chain length which adversely affects the solubility characteristics of the remainder of the mixture. Further, the fractional crystallization step does not produce the final fractions desired and it is necessary to distill separate fractions in order to obtain the desired final constituents.

An object of the present invention is to provide a process in which the tall oil is pre-treated to remove the saturated fatty acids of shorter chain length which has been found to adversely affect the solubility characteristics of remaining constituents to be treated by fractional crystallization. Yet another object is to provide a process in which tall oil is pre-treated by fractional distillation to produce a specific fraction or cut particularly responsive to fractional crystallization whereby important and sharply separated constituents of the tall oil are obtained. A further object is to provide a process in which the constituents of tall oil are recovered in relatively pure form at a minimum of cost and through a minimum of operations. Other specific objects and advantages will appear as the specification proceeds.

Our process comprises broadly the steps of pre-treating the tall oil by fractional distillation to remove in one fraction the palmitic acid together with a substantial amount of unsaponifiable matter. We obtain further a second fraction containing linoleic and oleic acid with a relatively small amount of rosin. The second fraction is subjected to fractional crystallization, preferably with a solvent such as acetone, etc., and in the resulting solid phase oleic acid is obtained in substantially pure form. The liquid phase yields linoleic acid low in rosin content.

A further advantage of the above process is that the initial fractional distillation step provides, in addition to the fractions mentioned, a third fraction consisting of rosin and a fourth fraction consisting of pitch. The two-step operation, therefore, provides a separation of the palmitic acid rich in unsaponifiable matter, oleic acid, linoleic acid with a low rosin content, rosin, and a pitch residue. Further, it is not necessary to subject all of the tall oil to fractional crystallization but, instead, this step need be applied only to a single fraction, namely the second fraction produced in the pre-treatment operation.

By way of example, starting with crude tall oil, we obtain by fractional distillation a second fraction or cut which is substantially 40% of the charging stock and has an iodine value of 130, as well as a rosin content of 15%. By crystallization, we obtain in solid phase a product having an iodine value of 87.5 and containing no rosin. The yield is 40% based upon the charging stock in the crystallization operation and 16% based upon the charging stock in the original distillation operation. The liquid phase product has an iodine value of 158 and a rosin content of 30%. The yield is 60% based upon the charge to the second or crystallizing step, and 24% based upon the original charge in the distillation step.

In the above specific example, acetone was employed as a solvent in the proportion of 5 parts of solvent to 1 part of distillate. The temperature was reduced from −40° C. to −48° C., the preferable minimum temperature being −46° C. During the cooling or crystallizing period, we prefer to keep the mass in agitation. When the slurry is formed, the mass is filtered and the solid material washed with acetone at the temperature of the slurry.

It will be understood that the crystallizing temperatures employed will vary widely due to the particular solvent employed and due to other conditions such as the specific character of the starting material, etc.

In the fractional distillation or pre-treatment step, any suitable apparatus may be employed. Suitable apparatus and operating information is contained in the Potts et al. Patents No. 2,054,096 and No 2,224,984.

In the fractional crystallization operation, we find that improved results are obtained when solvents are employed. Any suitable solvents may be used, as, for example, acetone, methyl ethyl ketone, ethyl or methyl alcohol, low molecular weight aliphatic nitriles such as acetonitrile, low molecular weight nitro-paraffin such as nitroethane or nitromethane, benzol, paraffin hydrocarbons such as hexane, propane, butane, etc. Of these, we find acetone to be one of the most suitable. Mixtures of the solvents may also be employed.

The following table sets forth the yield percentages on three different charging stocks, the yield percentage figure indicated as "A" being based on the charge to the second step, while the yield percentage figure indicated by "B" is based on the charge to the first or distillation step:

| Distillation from Crude Tall Oil | | | Crystallization of Tall Oil Distillate | | | |
|---|---|---|---|---|---|---|
| Yield, Percent | Rosin, Percent | Iodine Value | Yield, Percent A | Yield, Percent B | Rosin, Percent | Iodine Value |
| 63.7 | 30 | 134 | 35 | 22.2 | 0 | 91.7 Crystal |
|  |  |  | 65 | 41.3 | 43 | 157 Liquid |
| 40 | 15 | 130 | 40 | 16.0 | 0 | 87.5 Crystal |
|  |  |  | 60 | 24.0 | 30 | 158 Liquid |
| 30 | 3 | 127 | 48 | 14.2 | 0 | 84 Crystal |
|  |  |  | 52 | 15.6 | 6 | 168 Liquid |

From the foregoing, it will be noted that the combined fractional distillation and crystallation will produce a product low in rosin and high in linoleic acid content as well as one high in oleic acid and free of rosin. A single fractional distillation followed by solvent crystallization of but one fraction obtained in the distillation step, results in four fractions, one of which is essentially rosin, a second of which is relatively pure oleic acid, a third of which is rich in linoleic acid, and a fourth fraction which consists of palmitic acid rich in unsaponifiable matter.

Through the removal of the palmitic acid rich in unsaponifiable matter from the mixture to be crystallized, we find that the adverse effect produced by the short-carbon-length acid upon solubilities of other constituents is eliminated. The presence of the palmitic acid rich in unsaponifiable matter seems to narrow the differential between the temperature at which the oleic and linoleic acids crystallize, making separation difficult and resulting in an impurity of the separate portions obtained.

The fractional distillation step results in the separate recovery of palmitic, rosin and pitch fractions and a single fraction containing oleic and linoleic acids with a very low rosin content. By applying fractional crystallization to the latter fraction from which the material adversely affecting solubilities have been removed, we obtain a relatively pure oleic acid fraction and a separate linoleic acid fraction which has a low rosin acid content.

By the combination and sequence of fractionating steps herein described we are able to obtain each of these commercially desired products with a minimum of material handling and processing.

While in the foregoing description, we have set out the process in substantial detail and with specific examples, it will be understood that such details may be varied widely by those skilled in the art without departing from the spirit of our invention.

We claim:

1. In a process for treating tall oil, the steps of fractionally distilling tall oil, withdrawing an overhead fraction consisting mainly of low-boiling unsaponifiable matter and palmitic acid, taking off a second fraction consisting mainly of oleic acid and linoleic acid and fractionally crystallizing the second fraction to obtain oleic acid in the solid phase.

2. In a process for treating tall oil, the steps of fractionally distilling tall oil, withdrawing an overhead fraction consisting mainly of low-boiling unsaponifiable matter and palmitic acid, taking off a second fraction consisting mainly of oleic acid and linoleic acid and fractionally crystallizing the second fraction to obtain linoleic acid in the liquid phase.

3. In a process for treating tall oil, the steps of fractionally distilling tall oil to remove palmitic acid and low-boiling unsaponifiable matter, and to recover a fraction consisting mainly of oleic and linoleic acids, and fractionally crystallizing the latter fraction in the presence of a solvent and at a temperature at which oleic acid is substantially crystallized, and separating the solid and liquid phase.

4. In a process for treating tall oil, the steps of fractionally distilling tall oil, withdrawing an overhead fraction consisting mainly of low-boiling, unsaponifiable matter and palmitic acid, taking off a second fraction consisting mainly of oleic and linoleic acid and a small proportion of rosin, and fractionally crystallizing the second fraction to obtain oleic acid in the solid phase.

EMMETT P. GLYNN.
BURT F. HOFFERTH.

References Cited in the file of this patent

UNITED STATES PATENTS

| Number | Name | Date |
|---|---|---|
| 2,054,096 | Potts et al. | Sept. 15, 1936 |
| 2,143,345 | Frankel et al. | Jan. 10, 1939 |
| 2,224,984 | Potts et al. | Dec. 17, 1940 |
| 2,305,498 | Segessmann | Dec. 15, 1942 |
| 2,351,249 | Ziegler et al. | June 13, 1944 |

OTHER REFERENCES

Klatt, "Flussiges Harz (Talloel)" Fettchem. Unschau 1934, Heft 5, pages 90–94. (Copy in Scientific Library.)